United States Patent [19]

Bendick

[11] 4,382,337

[45] May 10, 1983

[54] DEVICE FOR LOCATING SUSPENSION HOOK

[76] Inventor: Robert L. Bendick, 360 Grace Church St., Rye, N.Y. 10580

[21] Appl. No.: 336,921

[22] Filed: Jan. 4, 1982

[51] Int. Cl.3 .............................................. G01B 3/02
[52] U.S. Cl. .................................... 33/180 R; 33/189
[58] Field of Search .......................... 33/180 R, 189 R

[56] References Cited

U.S. PATENT DOCUMENTS 3,516,165 6/1970 Pfeffer .............................. 33/180 R

*Primary Examiner*—Harry N. Haroian
*Attorney, Agent, or Firm*—Henry R. Lerner

[57] ABSTRACT

A device for marking the location on a wall in which to place a nail or hook for suspending an article, such as a picture frame, of the type having a supporting cord on the back thereof. The device comprises a carrier member adapted to be suspended by a flexible element in a general vertical direction. The carrier member is provided with a marking pointer extending from one side of the carrier member in a horizontal direction. The pointer is grooved adjacent the carrier member for firmly receiving the cord of the article to be hung. The carrier member, together with the article supported by engagement of its cord with the pointer, is positioned at the desired location on the wall to make an impression on the wall for locating the hook which will automatically permit the article to be supported on the wall at the desired location.

4 Claims, 8 Drawing Figures

DEVICE FOR LOCATING SUSPENSION HOOK

BACKGROUND OF THE INVENTION

The present invention relates to a device for easily marking the location on a wall in which to place a nail or hook for suspending an article, such as a picture frame, at a desired place.

To enable the hanging on a wall of an article such as a picture frame, it is commonly provided on the back thereof with a horizontally extending cord secured to the frame at its opposite free ends. The cord is somewhat longer than the straight line distance between the points of securement permitting the cord to be engaged by a hook on the wall for supporting the picture. When so hung, the frame will assume a position automatically determined by the location of the hook, the slack in the cord and its position relative to the contour of the frame.

It then becomes rather cumbersome and complicated to figure out where to insert the nail or hook in order for the frame to occupy the intended location on the wall, usually in a desired spaced relationship with respect to a certain frame of reference often defined by other pictures already hanging on the wall. What must be done is to estimate the location of the high point on the cord when it is taut, measure the distance between this estimated point and the contour edges of the frame, measure the horizontal spacing between a vertical edge of the frame and the frame of reference, measure the vertical spacing between a horizontal edge of the frame and the frame of reference, and hope that no mistakes were made in the process. Anyone who has ever hung pictures on a wall in the manner described above knows only too well how unsatisfactory a process it is, rarely yielding the desired results in the first try.

It is therefore an object of this invention to provide a simple and economical device for easily marking the location for the hook or nail on the wall which will guarantee that the picture on the hook will occupy the desired location, without requiring any measurements whatsoever, real or estimated.

BRIEF DESCRIPTION OF THE INVENTION

In accordance with the invention, there is provided a carrier member such as a relatively flat disc adapted to be suspended in a vertical plane by a flexible member such as a string or wire threaded through an aperture in the carrier member. A cylindrically shaped marking pointer extends from one side of the disc in a horizontal direction and terminates in a point on the axis of the pointer. The pointer is provided adjacent the carrier disc with an upper groove adapted to receive the cord of the frame to be hung.

To use the marking device, the carrier is suspended by manually holding the flexible member and the cord of the frame is engaged in the groove of the pointer adjacent the disc causing the cord and frame to assume a position dictated by the existing gravitational forces, such position being identical to that which would be assumed when the frame is suspended on any other hook. The marking device together with the frame hanging therefrom is then brought to the wall and held so that the frame is located precisely in its intended final position. The frame is then pressed against the wall causing the pointer to make an indentation in the wall to mark the exact point at which the hook or nail is to be placed in order to guarantee that the picture hung on the nail will be suspended precisely where intended.

DESCRIPTION OF THE PREFERRED EMBODIMENTS

Figure 1:
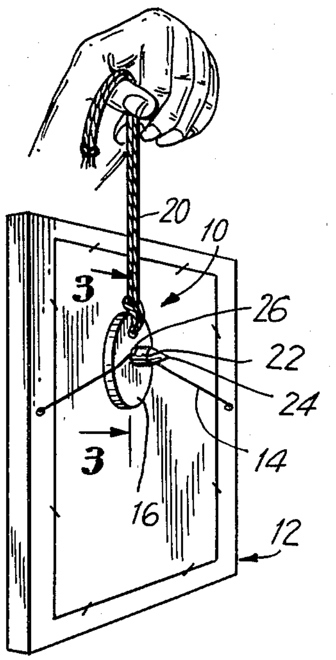
FIG. 1 is an elevational perspective view of the marking device in accordance with the invention with a frame suspended thereby.
Figure 2:
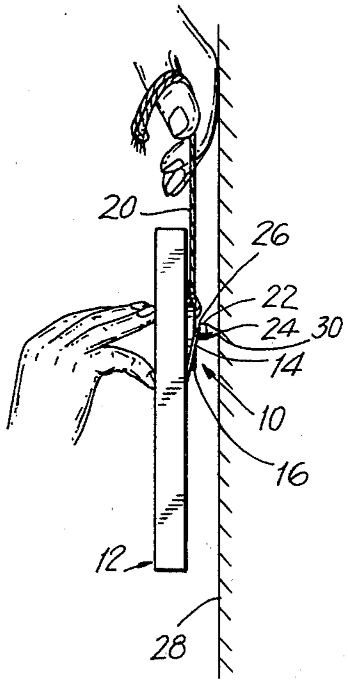
FIG. 2 is a side view of the device in FIG. 1, showing the same in position against a wall for making the indentation therein.
Figure 3:
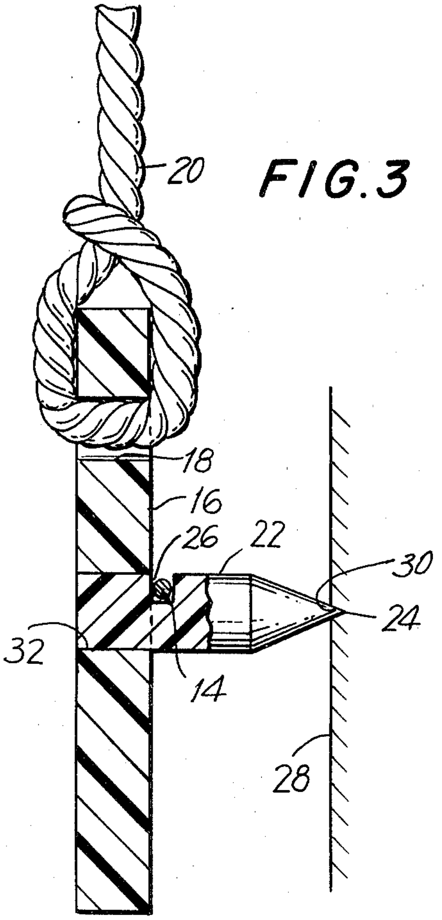
FIG. 3 is a section taken along line 3—3 of FIG. 1.

Referring now to FIGS. 1–3, there is shown a marking device 10 supporting picture frame 12 by its cord 14 secured at its opposite ends to the side of the frame with a certain amount of slack. Marking device 10 comprises a carrier member 16, in the form of a relatively flat disc, apertured as at 18 to permit the threading therethrough of flexible member 20, such as a thin rope, which is adapted to be held manually for suspending the carrier in generally vertical disposition.

A cylindrical marking pointer 22 extends from one side of carrier member 16 in a horizontal direction, terminating in a point 24. Pointer 22 is grooved adjacent carrier 16 as at 26 to permit the cord 14 of frame 12 to be firmly received therein.

As shown in FIG. 1, frame 12 which is to be hung on the wall is supported by marking device 10 through the engagement of cord 14 in groove 26, the combination being suspended manually by holding the free upper end of flexible member 20. In the condition shown in FIG. 1, the frame will assume the position relative to pointer 22 as dictated by the existing gravitational forces, such relative pointer being identical to that which would be assumed when the frame is suspended on a hook. The frame is now placed against wall 28, as shown in FIG. 2, at the desired location, and the frame is then pressed against the wall 28 causing point 24 to form a visible indentation 30 in the wall. All that needs to be done thereafter is to insert a nail or hook at indentation 30 in the wall and engage cord 14 with such nail for hanging the frame in precisely the desired location.

It will be noted that groove 26, in addition to providing a recess for firmly receiving cord 14, also serves to place the cord substantially on the axis of pointer 22, in line with point 24, to faithfully reproduce the conditions which will prevail when the cord engages the nail on the wall.

Carrier 16 and pointer 22 in FIGS. 1–3 are preferably made of plastic with the pointer press-fit within a complementary aperture 32 in the carrier. The plastic material is relatively hard to enable indentations to be made by point 24 without dulling the same.

Figure 4:
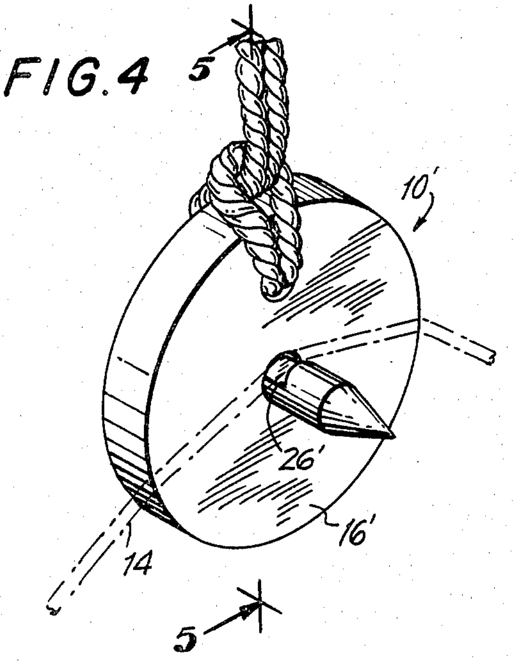
FIG. 4 is an elevational perspective view of another embodiment of the invention.
Figure 5:
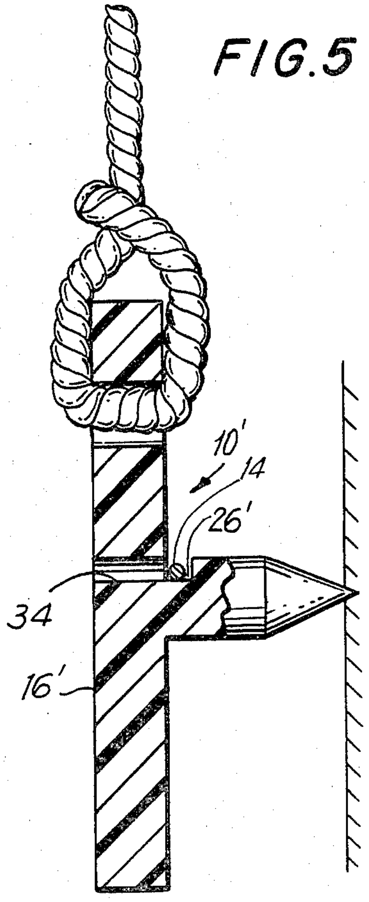
FIG. 5 is a section taken along line 5—5 of FIG. 3.

The embodiment 10' of FIGS. 4 and 5 is substantially similar to that of FIGS. 1–3 except only that it is a one piece molded unit. The one piece molding operation requires the use of a core to form groove 26' leaving a slot 34 in carrier member. In all other respects marking device 10' is identical to 10 in FIGS. 1-3.

Figure 6:
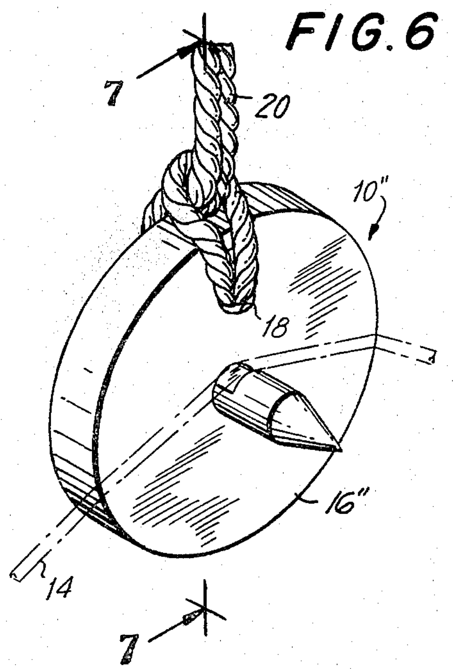
FIG. 6 is an elevational perspective view of yet another embodiment of the invention.
Figure 7:
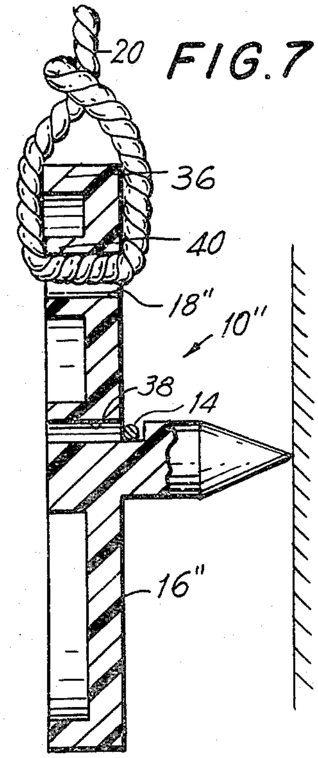
FIG. 7 is a section taken along line 7—7 of FIG 6.

FIGS. 6 and 7 illustrate yet another embodiment 10" of the marking device in accordance with the invention. In accordance with this embodiment, the carrier member comprises a flat disc 16", a peripheral flange 36 and a hub 40 for enlarging the depth of aperture 18" through which flexible member 20 is threaded. This embodiment is also contemplated as a one piece molded member and functions in all respects in the same manner as the previously described embodiments.

Figure 8:
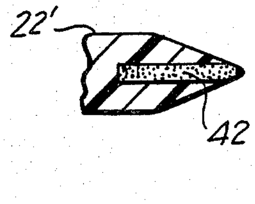
FIG. 8 is a sectional view through a marking pointer in accordance with another embodiment.

In accordance with another feature of the invention the marking pointer 22', as shown in FIG. 8, is provided with element 42 which may be a ball point or lead for marking the location on the wall, making it unnecessary to form an indentation in the wall.

While the invention has been described in connection with the hanging of a picture frame, it will be understood that it is equally applicable to other articles intended to be hung, so long as such other articles are normally suspended by a cord. It will also be understood that the invention is applicable to hang articles normally suspended by an eyelet or other support means which can receive pointer 22.

While there is herein shown and described the preferred embodiment of the invention, it will be understood that the invention may be embodied otherwise than as herein specifically illustrated or described, and that in the illustrated embodiment certain changes in the details of construction and in the form and arrangement of parts may be made without departing from the underlying idea or principles of this invention within the scope of the appended claims.

Having thus described my invention, what I claim and desire to secure by Letters Patent is:

1. A device for marking the location of a suspension element on a wall, said suspension element being adapted to support on said wall an article having a cord engaged with said suspension element, comprising, (a) a carrier member, (b) a marking pointer extending from one side of said carrier member, (c) an elongated flexible member threaded through an aperture in the carrier member for suspending said carrier member in substantially vertical disposition in which said pointer extends horizontally, (d) said pointer being provided with a groove adjacent the carrier member for receiving the cord of said article for supporting said article in the same manner as said article would be supported on a wall by engagement of the cord with a suspension element on the wall, (e) whereby the carrier member together with the article supported by engagement of its cord with the groove on the pointer can be positioned at the desired location on the wall to enable the pointer to make an impression on the wall for locating a suspension element which will automatically permit the same article to be supported on said wall at said desired location, (f) said carrier member being compact in shape and confined within the periphery of said article when said article is supported by said carrier member, and (g) said carrier member and pointer being molded in one piece.

2. A device in accordance with claim 1, wherein the pointer is cylindrically shaped as it extends from the carrier member and terminates in a point on the axis of the pointer.

3. A device in accordance with claim 1, wherein the marking pointer contains an element adapted to make a visible impression on a surface without indentation thereof.

4. A device in accordance with claim 1, wherein the carrier member is a circular disc.

* * * * *